Patented June 9, 1942

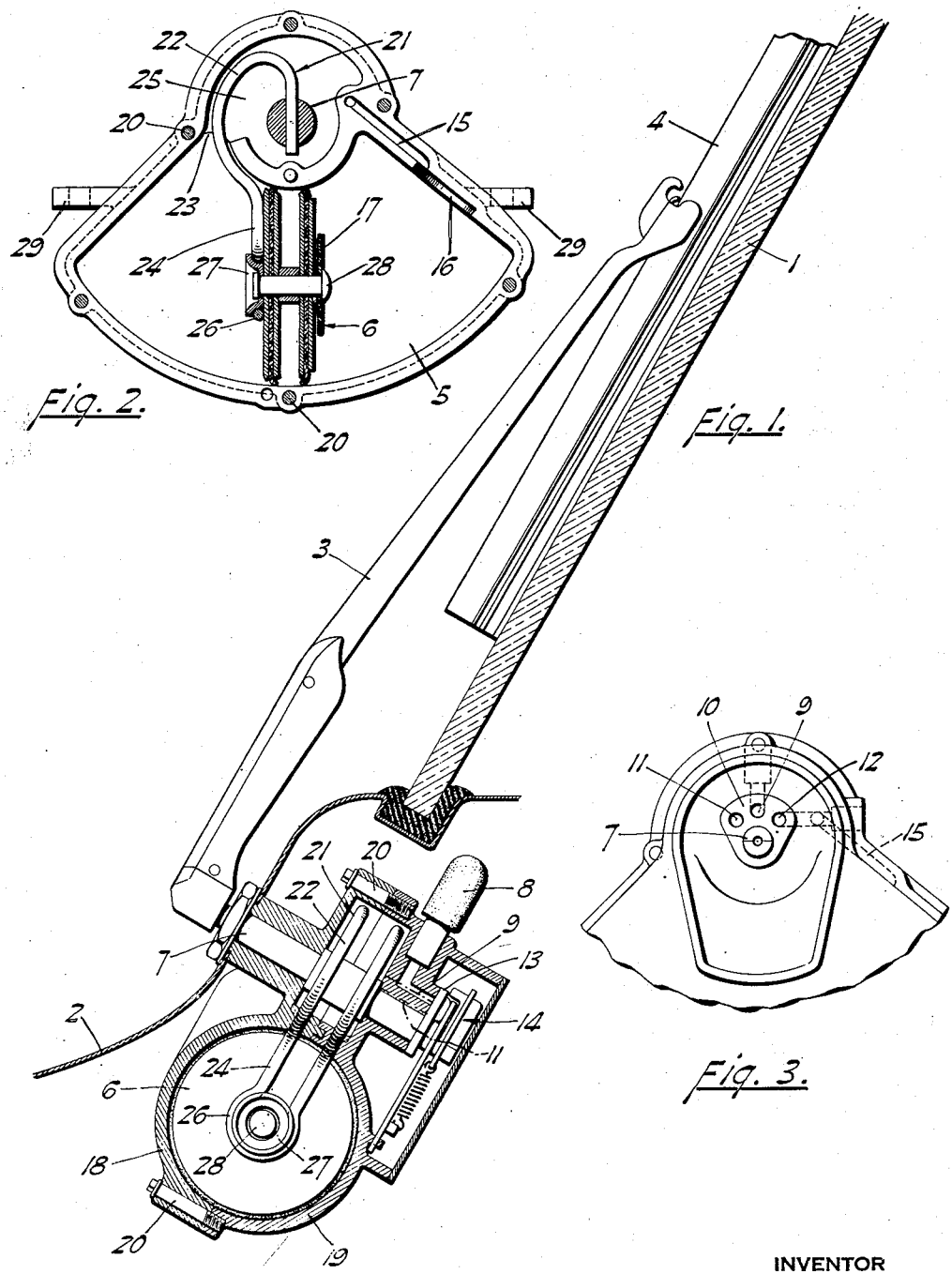

2,285,621

UNITED STATES PATENT OFFICE 2,285,621

WINDSHIELD CLEANER MOTOR

Edward W. Sibley, Kenmore, N. Y., assignor to Trico Products Corporation, Buffalo, N. Y.

Application February 25, 1939, Serial No. 258,523

3 Claims. (Cl. 121—97)

This invention relates to a windshield cleaner and more particularly to the wiper motor thereof. Various types of fluid pressure operated motors have been devised for the actuation of windshield wiping squeegees and especially of the suction operated type in which the intake manifold of the motor vehicle engine is used to provide the pressure differential.

An object of the present invention is to provide a wiper motor of the suction operated type which is of simple construction and design to thereby facilitate the die casting of the motor body. Furthermore, the invention provides a motor of vane construction in which the vane piston is of circular section and is directly connected to the wiper shaft in a manner to ease the action of the mechanism when reversing the wiper stroke or when the wiper is abnormally obstructed in its movement.

In the accompanying drawing showing one embodiment of the present invention

Fig. 1 is a fragmentary sectional view through the motor in its operative position on a motor vehicle;

Fig. 2 is a sectional view through the motor with one part of the motor housing being removed; and Fig. 3 is a detailed view of the motor ports.

Referring more particularly to the drawing, the numeral 1 designates the motor vehicle windshield and 2 the underlying cowl portion beneath which the motor is mounted to oscillate the arm 3 for imparting back and forth movement to the wiper 4 on the windshield.

The motor generally comprises a chamber 5 in which reciprocates a piston 6 for imparting oscillatory movement to the shaft 7 to which latter the arm 3 is connected. The motor is connected to a source of suction by a hose 8 which opens through a port 9 on a valve seat 10 and is adapted to be alternately connected to ports 11 and 12 by means of a valve 13 forming a part of an automatic valve mechanism, generally indicated at 14, and which may be of any approved construction, such as is shown in Patent No. 1,978,634, granted October 30, 1934, to Henry Hueber. The ports 11 and 12 communicate with the chamber 5 at opposite sides of the piston 6 and consequently when the valve 13 connects ports 9 and 11, the port 12 being then open to the atmosphere, a pressure differential will be placed on the piston 6 tending to move said piston to the left as shown in Fig. 2, and when the valve 13 is moved to connect port 9 with port 12 a reverse pressure differential will be placed upon the piston to move the latter to the right. The port 12 leads through a wall passage 15 and opens into the chamber 5 through an enlarged port 16 over which a valve disc 17 is adapted to seat so that the suction may be confined when parking or bringing the wiper to rest and holding it in such rest position.

To facilitate the die casting of the motor housing in which the chamber 5 is formed, said housing is divided into sections 18 and 19 separable in an axial manner, being divided in a plane perpendicular to the axis of rotation of shaft 7 and secured together by bolts 20. The wall passage 15 leading from port 12 to chamber 5 may conveniently be formed in the abutting edges of the housing sections.

The piston 6 being of circular section gives a minimum perimeter with less likelihood of leakage and enables a more thorough sealing or packing of the same. This circular piston is fixedly connected to the wiper or motor shaft 7 by a supporting arm 21, and in order to avoid packing of the arm as it moves with the piston said arm is given an arcuate portion 22 concentric with the shaft 7 which enters the chamber 5 through a throat 23. The arm 21 is secured in a diametrical opening in the shaft 7 substantially in the plane of the piston 6 but extends from the opposite side of the shaft and is joined by the arcuate portion 22 with the piston carrying terminal 24. This produces a housing structure in which the chamber 5 is joined to a centrally located arm chamber 25 by the throat 23, the arcuate portion 22 of the arm moving back and forth within the chamber 25 and from the latter into the chamber 5 as the piston recedes from the throat 23. The chamber 25 is of small capacity so that when the left end of the chamber 5 is evacuated the presence of the chamber 25 will not materially detract from the speed of the return movement of the piston toward the throat. The piston carrying arm 21 may be formed from wire stock bent centrally to form a bight 26 with which a clamping washer 27 is engaged to facilitate the attachment of the piston to its arm by the fastening rivet 28. The opposite legs of the U-shaped wire arm are thence extended and shaped to provide the arcuate portion 22 and the shaft engaging part. Being made of light stock the arm 21 is adapted to yield slightly, such as when the wiper blade 4 is abnormally obstructed by snow, and thereby provides a cushioning action between the piston and its wiper shaft. The arcuate or concentric portion 22 of the piston arm substantially conforms to the inner circumference of the chamber 5 so as to follow closely the contour thereof as the piston moves. This permits the use of a restricted throat 23 for movement of the arm into and out of the piston chamber.

The motor housing may be mounted by the ears 29 on the vehicle body structure beneath the cowl 2 in a suitable manner, and while the foregoing description has been given in detail for the sake of clearness, it is obvious that the inventive principles herein disclosed may assume other physical embodiments without departing from the spirit or scope of the invention claimed.

I claim:

1. A windshield cleaner motor having complementary and abutting housing sections providing a plurality of chambers, and having a fluid passage formed in the abutting sections of the housing sections for intercommunication between the chambers, a wiper shaft operably mounted in one of said chambers, a piston reciprocable in the other chamber, an arm operable through said passage and yieldably connecting said shaft to said piston for oscillating the shaft, said arm intermediate its connection to the shaft and the piston being yieldable in the direction of the fluid force applied to the piston, and valve means for directing the flow of fluid pressure first to the shaft chamber and then to the piston chamber for operating the piston.

2. A windshield cleaner motor having a housing, an inner chamber and an outer chamber, a wiper shaft journalled in the inner chamber for oscillatory movement, said outer chamber being concentrically disposed about the axis of the shaft and having a passage at one end communicating with the inner chamber, a piston reciprocable in the outer chamber, valve means operable to connect the two chambers alternately to a source of operating pressure, and an arm yieldably connecting said shaft to said piston for oscillating the shaft, said arm formed of a length of wire stock bent into U-shape and having its free extremities engaged with the shaft and its bight portion extending substantially radially and secured to the piston, the intermediate portion of the legs of the U-shaped arm being of arcuate form and extending through the passage.

3. A windshield cleaner motor having complementary and abutting housing sections providing inner and outer chambers, and having a fluid passage formed in the abutting portions of the housing sections for intercommunication between the chambers, a wiper shaft journaled in the inner chamber, a piston reciprocable in the outer chamber, and an arm fixed at its inner end to the shaft and having an arcuate portion operable through said passage and terminating in a substantially radial outer end portion seating against and secured to said piston, said arcuate portion having a greater radius than that of the inner wall of the outer chamber and being yieldable in the direction of the fluid force applied to the piston.

EDWARD W. SIBLEY.